Patented Oct. 2, 1951

2,570,023

UNITED STATES PATENT OFFICE 2,570,023

PARASITICIDAL STEAM-CRACKED OIL EMULSION CONCENTRATE

Carl S. Carlson, Elizabeth, and Miller W. Swaney, Westfield, N. J., assignors to Standard Oil Development Company, a corporation of Delaware No Drawing. Application March 13, 1948,
Serial No. 14,825

2 Claims. (Cl. 167—28)

This invention relates to parasiticidal oils and more particulary to parasiticidal spray oil compositions suitable for application to plants, trees and shrubs in order to protect them from insecticidal pests.

Petroleum oils have long been used agriculturally as insecticide sprays for the control of certain types of insects affecting orchards and for the control of the eggs of these insects during certain periods of the year. These are generally referred to in the agricultural trade as "dormant oils" and "summer oils." However, the oils which can be tolerated by plant foliage without injury are of restricted insecticidal activity. When used for the control of both mites and aphids they usually require fortification by some of the more active insecticidal materials such as dinitro cresol. These conventional spray oils are usually of a highly paraffinic or naphthenic nature. On the other hand, when the aromatic type oils such as coal tar fractions are used for spray purposes, severe foliage injury usually results.

One of the objects of this invention is to provide an effective parasiticidal oil which is non-phytotoxic. Another object is to provide a parasiticidal oil whose concentration can be varied within wide limits in spray oil compositions and still retain its activity. Still another object is to provide a parasiticidal oil which is also an efficient solvent for other insecticides.

It has now been found that a particular type of cracked petroleum oils prepared by a special steam cracking of highly paraffinic gas oil is ideally adapted to attain the before-stated objects. These oils obtained by the special cracking process are non-injurious to foliage. When applied as described hereinafter even in low concentrations, they are especially effective against insects such as the European red mite and aphids which infest apple and peach trees.

The oils of this invention, in addition to being useful for the control of chewing and sucking insects on agricultural crops, also, are useful for the control of underground or boring insects, such as the wood destroying termites, borers, nematodes, and other soil borne organisms. They may also be used as repellents for various insects. They may further be employed as adjuvants for other active insecticidal and fungicidal materials for enhancing their effectiveness. Such materials include pyrethrum, rotenone, nicotine, lead arsenate, sulfur, Bordeaux mixture, di- p- chlorophenyl - trichloroethane commonly known as "DDT," and other agricultural materials.

These oils may be used in agricultural sprays as the sole, major, or minor ingredient. They may be combined with conventional mineral spray oils or used in aqueous sprays in concentrations of as low as 10%. The preferred mineral spray oils that may be used with the oils of this invention are the petroleum white oils or lubricating oil fractions such as medium or light lubricating oils, transformer oil, machine oil, deodorized kerosene, etc. These oils may be replaced in part or in whole by vehicles such as hydrogenated hydrocarbonns, paraffin oils, naphthalene, chlorinated hydrocarbons, acetone, chlorinated ethers, or the like, or mixtures thereof. It may be desirable to incorporate emulsifying agents when these oils are used as emulsion concentrates for aqueous sprays. The following may be used by way of example as suitable emulsifiers: various soaps, such as sodium resinate, sodium oleate, triethanolamine soaps, sulfonated and sulfated preparations, protein preparations, such as casein, egg albumen, casein-lime, casein-ammonia, fatty acid esters, amine salts, and the like, or mixtures thereof. The final compositions are sprayed directly from high pressure spray nozzles.

The method of preparation of the oils of this invention is as follows: A highly paraffinic virgin gas oil, boiling between 400 and 950° F. with a 31–33° API gravity and an aniline point of about 180° F., is thermally cracked at temperatures of 1100–1500° F. in the presence of a large excess of steam which may range up to 90 mol per cent based on the steam oil mixtures fed to the cracking reactor. This is characterized as an intensive or high conversion cracking operation and has been found to produce large quantities of highly unsaturated hydrocarbons of the olefinic and aromatic type, the aromatics consisting largely of alkylated aromatics of unique structure. From the cracking products which consist of various components from light gases to heavy tars, a special high boiling fraction is segregated boiling in the range of 625–775° F. (distilled under vacuum but the boiling point range computed to atmospheric pressure). It is this particular fraction synthesized by the specific process described which constitutes the basis of this invention. This material contains approximately 50% of aromatic hydrocarbons of special structure and about 50% aliphatic hydrocarbons.

The following examples will better illustrate the properties of these oils and their use for the stated purposes:

EXAMPLE I

Three samples of oils were prepared in the above-indicated manner and various physical characteristics determined. The operating conditions used in the preparation of these oils are indicated in the table below:

Table

| | Specific Gravity of Fraction vs. Cracking Conditions | | |
|---|---|---|---|
| Vapor temp. of cut, °F. | 1250°–1265° F. Coil Outlet Temp., 79 Mol Per cent Steam, 20 p. s. i. Coil Outlet | 1329° F. Coil Outlet Temp., 74.2 Mol Per cent Steam, 8–10 p. s. i. Coil Outlet | 1440° F. Coil Outlet Temp., 78 Mol Per cent Steam, 8 p. s. i. Coil Outlet |
| 625–650 | 1.008 | 1.011 | 1.084 |
| 650–675 | 1.018 | 1.040 | 1.095 |
| 675–700 | 1.028 | 1.040 | 1.104 |
| 700–725 | 1.039 | 1.048 | 1.111 |
| 725–750 | 1.050 | 1.052 | 1.116 |
| | Aniline Point | Aniline Point | |
| 725–750 | 0° F. | −10.1° F. | |
| | DMS | DMS | DMS |
| 625–650 | | | 100 |
| 675–750 | | 24 | |
| 725–750 | 14 | | |
| | KB | KB | |
| 625–650 | | 80 | |
| 675–750 | 104 | | |

DMS refers to dimethyl sulfate value. KB refers to kauri butanol value. These two, and the aniline points are measures of aromaticity. DMS represents the volume percentage of the sample dissolved when mixed with an equal volume of dimethyl sulfate. The aniline point is the maximum temperature needed for complete miscibility of equal volumes of the sample and aniline. Kauri butanol number is the volume of standard solution of kauri gum and butanol dissolved by the sample. High values for DMS and KB (between 0 and 100) represent high aromaticity while low aniline points indicates high aromaticity.

EXAMPLE II

In this experiment, three steam-cracked oils of the type described above were tested insecticidally against the German cockroach and the milkweed bug. An immersion type test was used in which a specified number of insects were immersed in 0.25% aqueous suspension of the test material for a period of two minutes, then drained, caged, and observed for 4 days. In these tests, two commercial coal tar "anthracene oils" designated as A and B below, were used for comparison. The results are tabulated.

| | 96 Hour Mortality | |
|---|---|---|
| Material Tested | Blatella germanica (German Roach) | Omelpeltus sociatus (Milkweed Bug) |
| | Per cent | Per cent |
| Control | 5 | 5 |
| Broad distillate from steam-cracked virgin gas oil at 1,250° F | 53 | 100 |
| A gas oil stock cracked at 1,350° F | 78 | 100 |
| Gas oil stock cracked at 1,400° F | 100 | 100 |
| Coal tar anthracene oil A | 68 | 76 |
| Coal tar anthracene oil B | 75 | 52 |

It is apparent from these results that the steam cracked materials, while running only about 50% aromatic content were appreciably more insecticidal than the two coal tar anthracene oils which were substantially 100% aromatic content.

EXAMPLE III

In another experiment two selected boiling range fractions from the steam cracking of virgin gas oil at 1250° F. were tested against the European red mite by spraying infested foliage with a 0.25% aqueous suspension spray of the materials in question.

| Material Sprayed | Red Mite Mortality |
|---|---|
| | Per cent |
| 475–625° F. fraction | 44 |
| 625–775° F. fraction | 88 |

It can be seen that the more insecticidal components reside in the 625–775° F. boiling range material. When a 0.25% aqueous suspension of these materials were sprayed on apple foliage and eggplant foliage, no perceptible plant injury occurred.

In addition, oils prepared by the methods of this invention are excellent solvents for dichlorodiphenyltrichlorethanes, particularly di-p-chlorophenyltrichlorethane, which is known to be toxic to a wide variety of household and garden insects. DDT is ordinarily prepared in 5% solutions of deodorized kerosene. A solution of that strength is virtually saturated. In addition, slight decreases in atmospheric temperature result in substantial crystallization of the DDT out of solution. The solubility of commercial DDT in the oils of this invention is about 30%. In addition, these oils exhibit excellent DDT low temperature retention characteristics. The oils can thus be used as a co-solvent for DDT to increase its solubility in the conventional spray oils, or in either of the two conventional dispersion means for DDT, i. e., 5% spray oil compositions and emulsion concentrates.

Typical formulations for each type of dispersion means follow:

DDT spray oil composition:
 5% DDT
 15% specially steam-cracked oil
 80% mineral spray oil DDT emulsion concentrate:
 26% DDT
 69% specially steam-cracked oil
 5% emulsifier The invention is not intended to be limited by the specific examples which have been given to illustrate preferred embodiments. Various changes may be made within the scope of this invention as defined in the appended claims.

What is claimed is:

1. A parasiticidal oil emulsion concentrate comprising a highly aromatic, synthetic, steam-cracked petroleum paraffin gas oil fraction, said synthetic fraction having been cracked at a temperature in the range of 1100° to 1500° F., and having a specific gravity in the range of 1.00 and 1.125, a boiling point in the range of 625° to 775° F., a kauri butanol value in the range of 80 to 104 and a dimethyl sulfate value in the range of 14 to 100, in combination with a water soluble emulsifying agent.

2. A mineral oil horticultural spray composition comprising a highly aromatic, synthetic, steam-cracked petroleum paraffin gas oil fraction, said synthetic fraction having been cracked at a temperature in the range of 1100° to 1500° F., and having a specific gravity in the range of 1.00 and 1.125, a boiling point in the range of 625° to 775° F., a kauri butanol value in the range of 80 to 104 and a dimethyl sulfate value in the range of 14 to 100, dissolved in said mineral oil.

CARL S. CARLSON.
MILLER W. SWANEY.

REFERENCES CITED

The following references are of record in the file of this patent:

UNITED STATES PATENTS

| Number | Name | Date |
|---|---|---|
| Re. 22,922 | Muller | Sept. 30, 1947 |
| 2,346,642 | Babcock et al. | Apr. 18, 1944 |
| 2,363,903 | Smith | Nov. 28, 1944 |
| 2,374,387 | Shipp et al. | Apr. 24, 1945 |
| 2,377,847 | Allen et al. | June 12, 1945 |
| 2,448,665 | Fleck et al. | Sept. 7, 1948 |

OTHER REFERENCES

Sachanen: Chem. Constituents of Petroleum, 1945, pages 271–275 (particularly page 273).

Jones et al.: Soap and Sanitary Chemicals, pages 110–113, 115, 155, November 1945.